United States Patent [19]

Emmert

[11] 3,801,039

[45] Apr. 2, 1974

[54] TAPE APPARATUS FOR USE WITH TAPE CASSETTES

[75] Inventor: Reinhold Emmert, Fuerth, Germany

[73] Assignees: Grundig E.M.V. Electro-Mechanische Versuchsanstalt, Fuerth, Bayern, Germany

[22] Filed: Dec. 29, 1972

[21] Appl. No.: 319,844

[30] Foreign Application Priority Data

Jan. 4, 1972 Germany........................... 2200151

[52] U.S. Cl................... 242/191, 242/199, 274/4 C

[51] Int. Cl.... B65h 59/38, G03b 1/02, G11b 15/13

[58] Field of Search.................... 242/191, 197–200; 274/4 C, 4 D, 11 C, 11 D

[56] References Cited

UNITED STATES PATENTS

| | | | |
|---|---|---|---|
| 3,480,230 | 11/1969 | Husono et al. | 242/191 |
| 3,637,163 | 1/1972 | Apitz | 242/191 |
| 3,653,607 | 4/1972 | Lambeck et al. | 242/191 |
| 3,677,493 | 7/1972 | Staar | 242/191 |

*Primary Examiner*—Leonard Christian
*Attorney, Agent, or Firm*—Michael S. Striker

[57] ABSTRACT

A take-up spindle rotates at a first speed when a cassette tape advances in the play and forward modes of the apparatus. A pay-out spindle rotates at a higher second speed when the tape advances in the fast forward and the rewind modes of the apparatus. An electrical drive is connected with the spindles for rotating the same, and an arrangement for terminating the operation of the drive is provided, when the tape is fully spooled onto one or the other reel of the cassette. The arrangement includes a carrier movable between two positions and carrying a wheel on which is mounted a centrifugal switch which is connected into the current supply circuit of the electrical drive. The wheel is directly driven by the pay-out spindle when the carrier is in one position and is indirectly driven via a step-up gear by the take-up spindle when the carrier is in the other position.

7 Claims, 4 Drawing Figures

TAPE APPARATUS FOR USE WITH TAPE CASSETTES

BACKGROUND OF THE INVENTION

The present invention relates generally to a tape apparatus, and more particularly to a tape apparatus for use with cassettes having two reels and a magnetic tape which is to be spooled from one to the other of these reels.

Still more particularly, the present invention relates to an arrangement for switching off the drive of such a tape apparatus when the magnetic tape has been spooled onto one or the other of the reels. The problem of switching off a tape apparatus, especially apparatus using the well-known so-called "compact cassettes," when the tape has come to an end, that is when it has been completely spooled from one to the other reel of the cassette, has long been recognized and various solutions have been provided. It is, of course, desirable that such an arrangement be operative without having to provide special arrangements on the cassette itself. In this manner the arrangement will be operative with normal cassettes, that is without specially constructed cassettes.

One arrangement for this purpose uses the tension exerted upon the pay-out spindle when the tape has been completely spooled onto the cassette reel which is driven by the take-up spindle. The tension which is exerted upon the pay-out spindle operates a switch which then shuts off the drive of the tape apparatus.

A further approach to the problem utilizes a rotary component which turns as the pay-out spindle pays out tape during the operation of the apparatus in the recording or play-back mode. The rotary component is provided with an aperture which turns between a light source and a photoelectric resistor which supplies an impulse to a capacitor. The impulses produced in the resistor and capacitor are supplied to a switching relay which, when the impulses disappear (when the rotary component comes to a stop at the end of the tape) will change its operated position, that is will effect switching in a sense turning off the drive. This type of electronic switching arrangement has, incidentally, also been suggested in conjunction with a mechanically operable switching contact for producing the impulses.

Another approach operates on the principle of a differential drive where, when one of the spindles turns at or below a certain number of rotations or comes to a standstill, the planetary gear will reverse its direction of movement and will thereby activate a contact shutting off the drive.

Still another prior-art proposal activates a drive switching off the contact in that a body of rotation which is coupled with the pressure roller for the tape is moved to one switching position under the influence of centrifugal force as the pressure roller rotates, and when the pressure roller comes to a standstill is moved under the influence of a spring to another switching position in which it deactivates the drive.

All of these prior-art proposals have certain disadvantages. They are either too complicated and expensive in their construction, which is particularly true if the are on a clearly electronic basis. Alternatively, then can be operated only when the apparatus is in the play-back or recording mode, but not when the apparatus is in the reverse or fast-forward mode.

SUMMARY OF THE INVENTION

It is, accordingly, an object of the present invention to overcome the disadvantages of the prior art.

More particularly, it is an object of the present invention to provide, in a tape apparatus for use with cassettes having two reels and a magnetic tape which is to be spooled from one to the other of these reels, an arrangement for terminating the operation of the tape apparatus drive means which is inexpensive and simple in its construction.

Another object of the invention is to provide such an arrangement which will operate in all operational modes of the apparatus, that is during play-back and recording as well as during rewinding or fast-forward.

An additional object of the invention is to provide such an arrangement which is capable of being universally installed in all types of tape apparatus using the aforementioned compact cassette.

In keeping with these objects, and with others which will become apparent hereafter, one feature of the invention resides, briefly stated, in a tape apparatus for use with cassettes having two reels and a magnetic tape which is to be spooled from one to the other of these reels, and more particularly in a combination in such an apparatus which comprises a take-up spindle adapted to rotate at a first speed when a cassette tape advances in the play and forward modes of the apparatus, and a pay-out spindle adapted to rotate at a higher second speed when a cassette tape advances in a fast-forward and rewind modes of the apparatus. Electrically operated drive means is operative for effecting rotation of the spindles. An arrangement is provided for terminating the operation of the drive means when the tape is fully spooled onto a respective one of the reels. This arrangement comprises a carrier movable between two positions, a wheel mounted on this carrier, a centrifugal switch mounted on the wheel for rotation therewith and interposed in a current supply circuit of the drive means, and transmitting means for directly transmitting driving motion from the pay-out spindle to the wheel when the carrier is in one of its positions, and for transmitting driving motion to the wheel from the take-up spindle via a step-up gearing when the carrier is in the other of its positions.

It is particularly advantageous if the step-up gearing is mounted on the carrier and is configurated in form of a gear having a larger-diameter and a smaller-diameter portion, each provided with teeth, with the teeth of the larger-diameter portion meshing with teeth provided on a smaller-diameter portion of the aforementioned wheel, the larger-diameter portion of which in turn meshes in one position of the carrier with teeth on the pay-out spindle. Thus, the teeth of the wheel and of the gear are in constant mesh with one another and in one position the wheel is directly driven by the pay-out spindle which rotates at high speed, whereas in the other position the wheel 3 is driven indirectly via the wheel 2 by the take-up spindle which rotates at lower speed.

It is further advantageous, according to the present invention, if the centrifugal switch has a contact side which can move between two positions radially with reference to the axis of rotation of the wheel on which it is mounted, being urged to one position by a biasing spring and being urged to the other position by one and preferably by two mirror symmetrically arranged centrifugal weights.

It is also advantageous if on the wheel there is mounted a pair of sliding ring contacts which are electrically insulated from one another and so arranged that when the wheel is at a standstill and the slide member is moved to its one position by the biasing spring, the contacts will be bridged and short-circuited by the slide member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
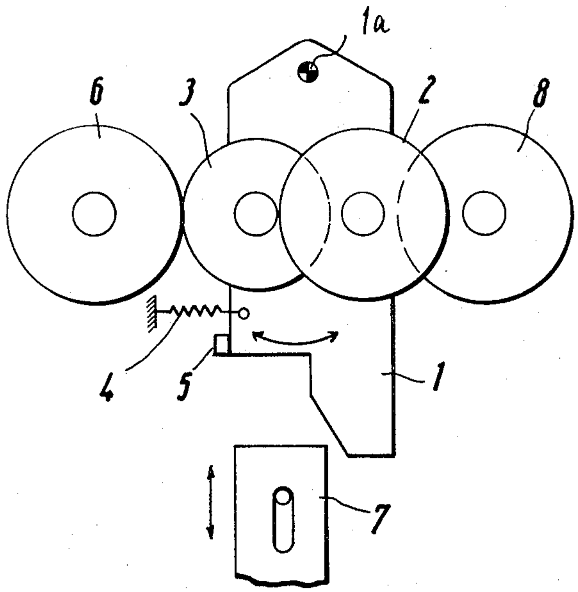
FIG. 1 is a somewhat diagrammatic top-plan view of an arrangement according to the present invention.

Before entering into a more detailed discussion of the drawing it is pointed out that all such components which are not directly necessary for an understanding of the present invention have been omitted in all Figures. Thus, evidently a tape apparatus of the type in question will have a housing, and will have various electronic components, it will have a drive train for transmitting motion to the take-up and pay-out spindles from the drive means, and it will have various other components which have all been omitted in the drawings because they are entirely conventional and known per se, and are not needed for an understanding of the invention. It is emphasized that the arrangement as illustrated can be used to equal advantage in any recorder and/or player capable of accepting so-called compact cassettes. The cassettes themselves are also fully well known, including a housing, two reels and a magnetic tape in the housing connected with the reels so they can be spooled from one reel to the other or vice versa. For this reason the cassettes also have not been illustrated.

Figure 2:
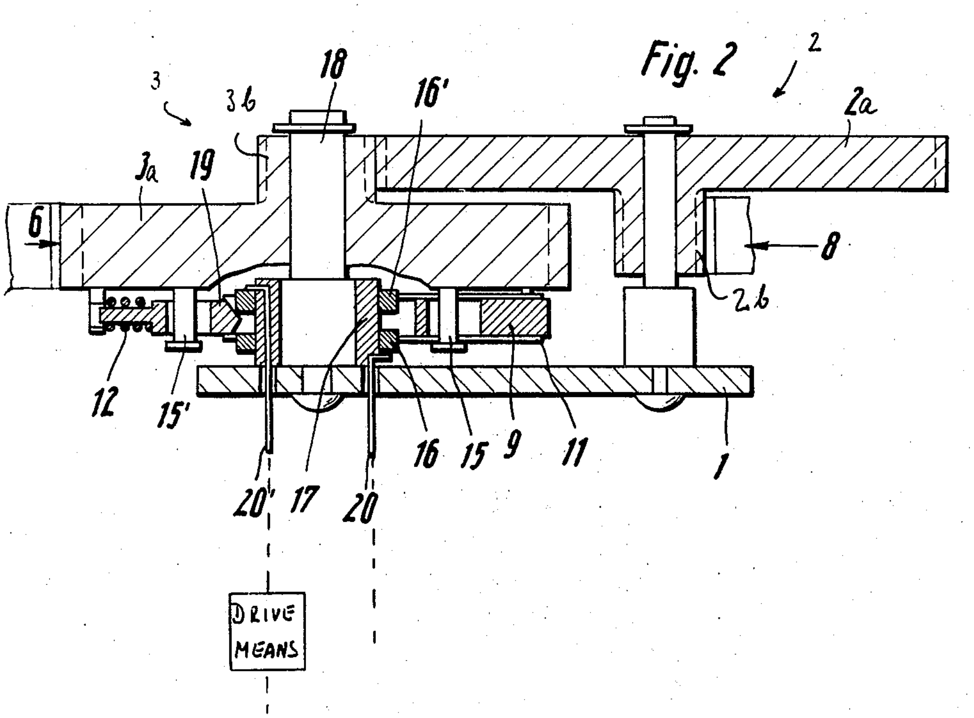
FIG. 2 is a vertical section through the embodiment shown in FIG. 1.
Figure 3:
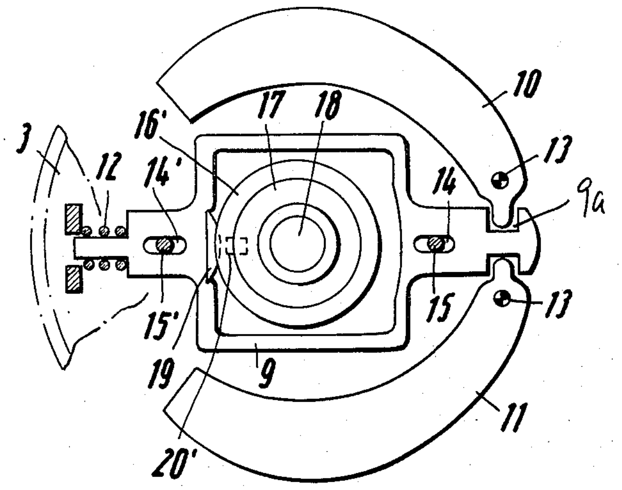
FIG. 3 is a top-plan view of FIG. 2, with the wheels and gears shown in FIG. 2 having been omitted for clarity.

With the above comments in mind, and considering firstly the embodiment in FIGS. 1–3, it will be seen that reference numeral 1 identifies a carrier which is pivotable about the pivot 1*a* in the direction indicated by the curved arrow in FIG. 1. The carrier 1 supports a wheel 2 having a larger-diameter portion 2*a* provided with an exterior annulus of gear teeth and a smaller-diameter portion 2*b* which is similarly provided with an exterior annulus of gear teeth. In addition, the carrier 1 also is provided with an additional wheel or gear 3 having a larger-diameter portion 3*a* provided with annulus of gear teeth on its external periphery, and a smaller-diameter portion 3*b* which is similarly provided with an exterior annulus of gear teeth. It should be understood that the gear teeth on the larger-diameter portion 2*a* are permanently in mesh with the gear teeth on the smaller diameter portion 3*b* as shown in FIG. 2. The gears 2 and 3 are mounted for rotation as illustrated, the shaft mounting the gear 3 having been identified with reference numeral 18 in FIG. 2.

A spring 4 is connected to an appropriate fixed component and to the carrier 1, permanently urging the same against a stationary abutment 5, that is towards the left in FIG. 1.

When the carrier 1 is in the illustrated position of FIGS. 1 and 2, the teeth on the larger-diameter portion 3a of the gear 3 are in mesh with teeth provided (but not illustrated) on the pay-out spindle 6. The spindle 6 has been illustrated only fragmentarily and diagrammatically in FIG. 2. The carrier 1 will remain in this position in the operative modes of the apparatus which are known as "stop," "rewind" and "fast-forward" in this art.

If, however, the apparatus is to be used in the operational modes known as "recording" and "play-back" the carrier 1 is pivoted towards the right in FIG. 1 by means of the slide 7 which is mounted appropriately on the chassey of the apparatus so that it can slide in the direction of the straight-line double-headed arrow in FIG. 1. In other words, when the member 7 is moved upwardly in FIG. 1 it will engage the inclined surface on the carrier 1, forcing the latter to pivot about the pivot 1*a* towards the right. Thus, the gear teeth of the portion 3*a* move out of mesh with those of the pay-out spinde 6, while at the same time the gear teeth of the portion 2*b* move into mesh with teeth provided for this purpose on the take-up spindle 8 which is again shown fragmentarily and diagrammatically in FIG. 2. This switchover is, of course, for the purpose of accommodating the differential speeds of rotation at recording and play-back operation on the one hand, and at rewind and fast-forward operation on the other hand, so that in either case the centrifugal switch mounted on the wheel 3 will be operated.

The centrifugal switch will be seen (see FIGS. 1 and 2) to have an electrically conductive slide member 9 which can be displaced counter to the force of a biasing spring 12 by one but, preferably two mirror-symmetrically arranged centrifugal weights 10 and 11. The weights 10 and 11, as clearly shown in FIG. 3, are each pivoted by at a pivot 13 to the wheel 3 and each have a portion which engages into a recess 9a provided in a stem of the member 9. The latter is provided in the illustrated embodiment with two elongated slots 14, 14' into each of which extends a pin 15, 15' which may have beads to prevent separation of member 9 from the pins. The arrangement of the slots and pins may of course be different from what has been illustrated, and it is also possible to provide other slidable arrangements, for instance guide rails which extend into guide grooves and which can be formed of one piece with the respective component.

FIG. 3 shows particularly clearly that a centrifugal switch further has a pair of sliding ring contacts 16, 16' which are mounted on a ring 17 of insulating material, the latter being so mounted on the shaft 18 of the wheel 3 that a contact portion 19 of the slide member 9 will bridge and short-out the two rings 16, 16' when the wheel 3 is stationary. When, however, the speed of rotation of the wheel 3 exceeds a predetermined level, then the centrifugal force acting upon the weights 10, 11 causes the same to pivot about the pivots 13 and to thereby displace the slide member 9 in such a manner as to move the contact portions 19 off the rings 16, 16' and to interrupt the contact. The supply of electrical energy to rings 16, 16' is effected via the terminals 20, 20' shown in FIG. 2, and the drive means for driving the spindles, and in whose current supply circuit the centrifugal switch is interposed, is diagrammatically illustrated in FIG. 2 and identified with an appropriate legend.

Figure 4:
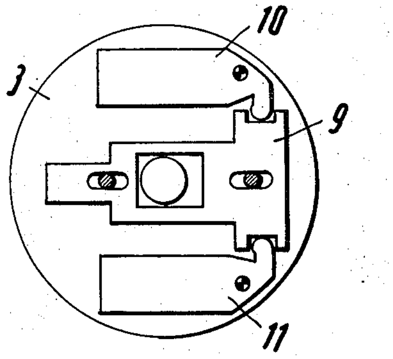
FIG. 4 is a view similar to FIG. 3 but illustrating a further embodiment of a centrifugal switch.

In FIG. 4, finally, I have illustrated a further embodiment of a centrifugal switch which can be used with the arrangement of FIGS. 1–3, but in which the centrifugal weights 10 and 11 are constructed and pivoted and arranged in a particularly advantageous manner, such that the influence of gravity on the centrifugal switch will be negated at least in a certain switching position.

Various modifications of the illustrated embodiment are possible without departing in any way from the scope and intent of the present invention. For instance, the centrifugal switch could be constructed as an Eddie current switch which might utilize a permanent magnet mounted on the wheel 3. A magnetizable disk could be mounted on the shaft of the wheel 3 and could be attracted by the permanent magnet at a certain speed of rotation of the same and of the wheel 3, counter to the force of the biasing spring and to such an extent as to control a switching contact.

It will be understood that each of the elements described above, or two or more together, may also find a useful application in other types of constructions differing from the types described above.

While the invention has been illustrated and described as embodied in a tape apparatus for using with compact cassettes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a tape apparatus for use with cassettes having two reels and a magnetic tape which is to be spooled from one to the other of these reels, a combination comprising a take-up spindle adapted to rotate at a first speed when a cassette tape advances in the play and forward modes of the apparatus; a pay-out spindle adapted to rotate at a higher second speed when a cassette tape advances in the fast forward and rewind modes of the apparatus; electrically operated drive means operative for effecting rotation of said spindles; and an arrangement for terminating the operation of said drive means when the tape is fully spooled onto a respective one of said reels, comprising a carrier movable between two positions, a wheel mounted on said carrier, a centrifugal switch mounted on said wheel for rotation therewith and interposed in a current supply circuit of said drive means, and transmitting means for directly transmitting driving motion from said pay-out spindle to said wheel when said carrier is in one of said positions, and for transmitting driving motion to said wheel from said take-up spindle via a step-up gearing when said carrier is in the other of said positions.

2. A combination as defined in claim 1, wherein said carrier is plate-shaped; and further comprising pivot means mounting said carrier for pivotal movement between said positions thereof.

3. A combination as defined in claim 1, said wheels having a larger-diameter first portion and a smaller-diameter second portion each provided with an annulus of gear teeth, and said step-up gearing comprising a gear mounted on said carrier and having a larger-diameter third portion and a smaller-diameter fourth portion each provided with an annulus of gear teeth, the gear teeth of said second and third portions being in permanent mesh.

4. A combination as defined in claim 3, wherein the gear teeth of said first portion are adapted to be driven by said pay-out spindle when said carrier is in said one position, and the gear teeth of said fourth portion are adapted to be driven by said take-up spindle when said carrier is in said other position.

5. A combination as defined in claim 1, said centrifugal switch comprising a pair of electrical contacts, an electrically conductive slide member slidably displaceable relative to said contacts of the axis of rotation of said wheel between a first and a second position, biasing means permanently biasing said slide member to said first position, and at least one centrifugal weight arranged to displace the slide member to said second position in response to said wheel rotating at a predetermined circumferential speed.

6. A combination as defined in claim 5, wherein said centrifugal switch further comprises an additional centrifugal weight mirror-symmetrically with reference to the first-mentioned centrifugal weight and cooperating with the same for displacing said slide member to said other position.

7. A combination as defined in claim 5, said contacts comprising a pair of sliding-ring contacts provided in said wheel electrically insulated from one another, said contacts being so arranged with reference to one another and to said slide member that the latter bridges and shorts said contacts when in said first position.

* * * * *